Patented May 11, 1937

2,080,049

UNITED STATES PATENT OFFICE 2,080,049

PRODUCTION OF DYES OF THE CYANINE TYPE

John David Kendall, Ilford, England, assignor to Ilford Limited, Ilford, England, a British company No Drawing. Application April 27, 1936, Serial No. 76,703. In Great Britain August 3, 1934

5 Claims. (Cl. 260—44)

This application corresponds to the applications of John David Kendall, Serial No. 22,727/34, filed 3rd August, 1934 and divisional application Serial No. 6,314/36, dated 3rd August, 1934, which were both filed in Great Britain.

This invention relates to the manufacture of compounds having a structure approximating to that of the known cyanine compounds but having one or two nitrogen atoms in the linking chain; more specifically the invention relates to the kind of compound (which is referred to hereinafter in the specification and claims as "compounds of the kind hereinbefore described") which may be either a free base or an alkyl salt, comprising a heterocyclic nitrogen ring linked to another heterocyclic nitrogen ring or to an isocyclic ring by a chain (attached to the carbon atom in the $\alpha$ or $\gamma$ position to the nitrogen in the heterocyclic nucleus) of one or more atoms joined by alternate double and single bonds, the chain always containing a nitrogen atom adjacent to the heterocyclic nucleus. The chain may consist of one nitrogen atom only (linking two heterocyclic nuclei) or of one nitrogen atom and one carbon atom (linking the heterocyclic nucleus to an isocyclic nucleus), or of one nitrogen atom and two carbon atoms (linking two heterocyclic nuclei) or in the case where the first heterocyclic nitrogen nucleus is linked to a second heterocyclic nitrogen nucleus, the chain may contain, in addition to a carbon atom, a second nitrogen atom adjacent to the second heterocyclic nucleus so that the two nitrogen atoms in the chain are always separated by a carbon atom. The carbon atoms of the chain may have hydrogen atoms or hydrocarbon groups attached to them in order to satisfy the valency requirements.

The following compounds are typical examples of the kind of compound described above:—

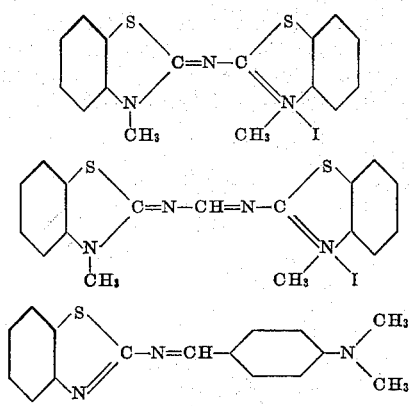

It is known that quaternary salts of heterocyclic nitrogen compounds having various reactive groupings such as methyl, alkyl mercapto, halogen or the like attached to carbon atoms in the $\alpha$ or $\gamma$ position to the nitrogen atom can be condensed with various substances to give compounds of the cyanine type that is, two nuclei joined by a polymethine chain of one or more carbon atoms, either substituted or unsubstituted. Among the most reactive of such groups is the methyl group, many of the reactions of which are described in the chemical literature.

In J. C. S. vol. 125, 1924, page 1348, Dr. Hamer has described a method of making an "azocyanine" by condensing 2-amino quinoline with 2-chloroquinoline by heating them together in a sealed tube to obtain 2:2'-diquinolylamine which was converted into 1-methyl dihydroquinolenyl 2-quinolyl 2'-imine by acetylating, methylating with methyl sulphate and treating the acetyl compound with sodium hydroxide, which compound was then converted to the 1:1'-dimethyl 2:2'-azocyanine iodide by heating in a sealed tube with methyl iodide.

German specification No. 595,361 describes a process for preparing pyridine compounds by condensing quaternary sulphates or sulphonic esters of 2-chlor or 2-brom pyridines with ammonia, primary amines, or hydrazine derivatives of the general formula $R^1R^2=N-NH_2$ including the condensation of chloro pyridine-methyl sulphate with 2-ethoxy-5-amino pyridine but the products obtained by this process are in every case different from those which, as indicated above, it is desired to produce by the process of the present invention.

I have now found that either an amino or an imino substituent group in the $\alpha$ or $\gamma$ position in heterocyclic nitrogen compounds or their quaternary salts is capable of reacting (in a manner similar to that of a reactive methyl group in the production of cyanine compounds having a carbon chain) to give an analogous series of compounds having one or two nitrogen atoms in the chain.

This invention accordingly consists in a process for the production of compounds of the kind hereinbefore described, comprising condensing a heterocyclic nitrogen base or its quaternary salt having an amino or imino group in the $\alpha$ or $\gamma$ position to a nitrogen atom, either with a quaternary salt of a further heterocyclic nitrogen compound having a reactive aminovinyl, thioether or selenoether grouping (including the reactive grouping of an alkyl salt of an N-alkyl thione or selenone) or substituted forms thereof in the $\alpha$ or $\gamma$ position to a nitrogen atom, or with a quaternary salt of a 2-halogenated compound of the quinoline series, or with an aromatic aldehyde, or with an orthoester of a mono-carboxylic acid.

In this specification and claims the expression "aminovinyl group" is intended to include the substituted aminovinyl groups such as acylaminovinyl-, aryl-aminovinyl-, and acyl-arylaminovinyl- groups, and the expression "thioether or selenoether" to include alkyl, aryl or aralkyl thioethers or selenoethers.

Following the procedure normally adopted in the production of compounds of the cyanine type, in carrying out the present invention the compound containing the reactive amino or imino grouping will normally be in the form of a quaternary salt, but in carrying out the present invention it is found that this is not essential, and that by employing the free base for the condensation reaction, a free base may be obtained as the product. For most purposes to which the products are to be employed it is preferable to convert the free base produced to a quaternary salt.

When the heterocyclic nitrogen compound having a reactive amino or imino group is condensed with a second heterocyclic compound having an alkyl mercapto group in the α or γ position to the nitrogen atom, the heterocyclic nitrogen base having the reactive amino or imino group, the second heterocyclic nitrogen base having an alkyl mercapto group in the α or γ position to the nitrogen atom and an alkyl salt may be fused together so that the formation of the quaternary salt and the condensation reaction are carried out simultaneously.

In certain cases when the quaternary salt of the compound containing the imino group is being employed, the imino group may react in the tautomeric amino form.

The amino or imino group may be attached to any of the heterocyclic nitrogen compounds usually employed in the preparation of cyanine compounds, for example, pyridine, quinolines, naphtha quinolines or their homologues, thiazoles, oxazoles, selenazoles and their homologues of the benzene, naphthalene and homologous series, including those described in my British patent No. 425,609, namely, diazoles such as pyrimidines, thiadiazoles and other heterocyclic ring compounds containing two nitrogen atoms in the same ring.

The amino oxazoles may be prepared by methods described in Richters Organic Chemistry, volume III, page 116.

Amino selenazoles may be obtained by condensing seleno urea with a monohalogenated ketane for example such as monochlor-acetone or mono-ω-bromacetophenone.

In carrying out the present invention the amino or imino compounds may be condensed directly with quaternary salts of any of the heterocyclic nitrogen compounds as commonly used in the preparation of the cyanine dyes, for example, pyridines, quinolines, naphtha quinolines or their homologues, thiazoles, oxazoles, selenazoles and their homologues of the benzene, naphthalene and homologous series, including those described in my British patent No. 425,609, having reactive thioether or selenoether groups or aminovinyl or substituted amino-vinyl groups in the α or γ position, or they may be condensed with quaternary salts of 2-halogenated compounds of the quinoline series, in both cases to yield symmetrical or unsymmetrical dyestuffs of a type analogous to the cyanine or carbocyanine dyes but having a nitrogen atom in the linking chain in a position adjacent one of the nuclei; the amino or imino compounds may also be condensed with the aldehyde group of aryl aldehydes, such as dimethyl amino benzaldehyde to yield compounds analogous to the styryl compounds.

With the ortho carboxylic esters, two molecules of the amino compound condense with one molecule of the ester to yield compounds, analogous to the carbocyanine dyes and the chain substituted carbocyanine dyes substituted at the central atom of the chain, having two nitrogen atoms in the linking chain situated at the end of the chain adjacent the nuclei.

In the preparation of the well known cyanine type of compounds, the reactions have usually to be carried out with quaternary salts of the heterocyclic compounds employed but I have found that this is not necessary in every case with the amino or imino substituted body, and that in some cases these amino compounds may be caused to condense, without first forming their quaternary salts, to yield compounds which, on treatment with an alkyl salt, yield a dyestuff of the new type. Some examples of condensation reactions which may be carried out with the amino or imino substituted bodies in accordance with this invention are as follows:

The quaternary salt of the amino body may be condensed with a quarternary salt of a thioether of a heterocyclic nitrogen compound of the type described in British patent No. 424,559 as shown by the following formulae:

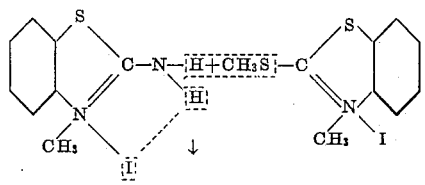

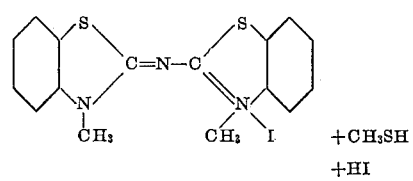

or expressed in the imino form as follows:

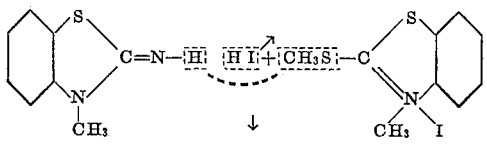

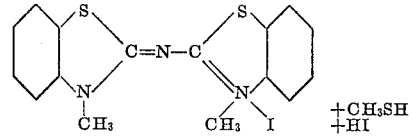

or again the quarternary salt of the amino body may be condensed with a quarternary salt of a thioether of a different heterocyclic compound to yield an unsymmetrical product, e. g.

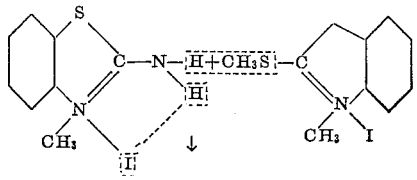

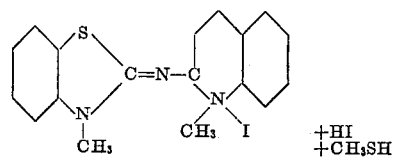

The quaternary salt of the amino body may be condensed with the quaternary salt of the halogenated quinoline compound

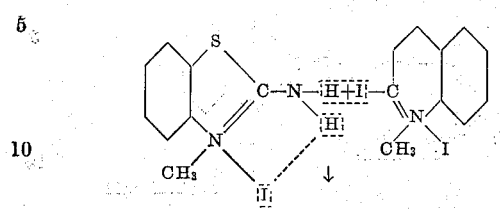

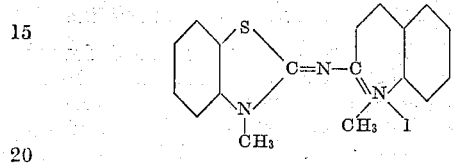

The amino compound may be condensed with the quaternary salt of a halogenated quinoline compound

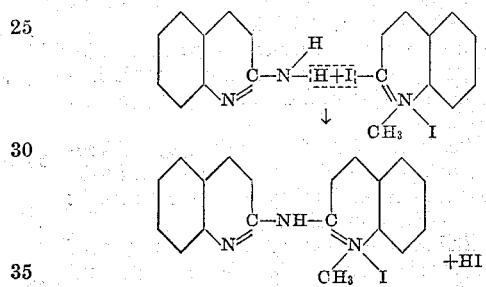

which on treatment with an alkyl salt yields the dye

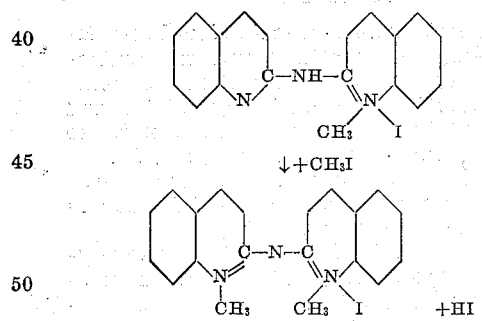

Two molecules of the quaternary salt of the amino compound may be condensed with ethyl ortho-formate

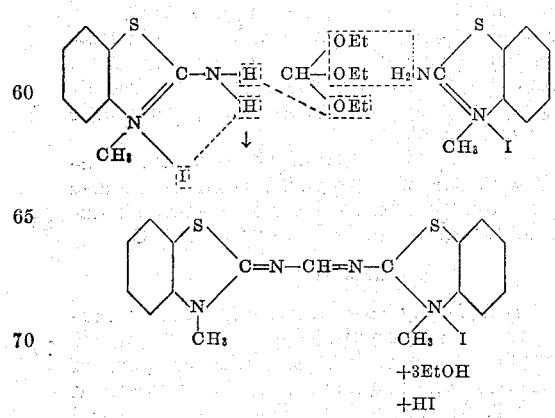

Two molecules of the amino body may be condensed with ethyl ortho-formate to form an amidine compound

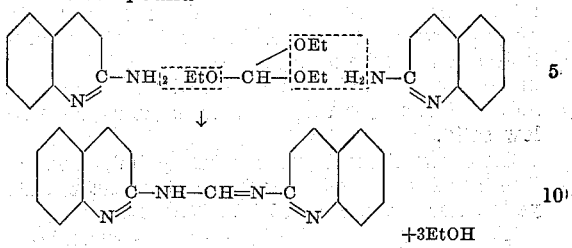

which may then be treated with an alkyl salt, e. g. methyl iodide to give a dyestuff as follows:

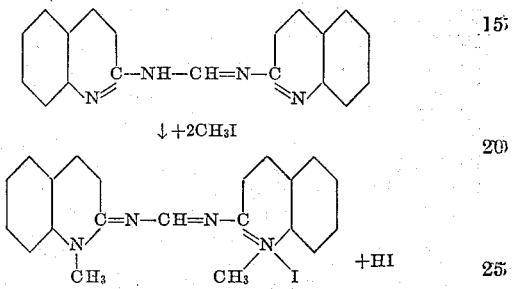

The amino body or its quaternary salt may be condensed with an aldehyde. When the quaternary salt is employed, the compound formed is extremely unstable, but when the base is employed the product is far more stable. As an illustration of such a reaction 1-amino-benzthiazole may be condensed with p-dimethyl-aminobenzaldehyde as follows—

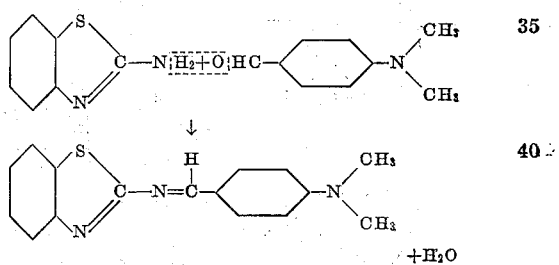

The reactions are preferably carried out in the presence of a suitable solvent such as pyridine, or in alcohol with sodium alcoholate.

The following are specific examples of the method of carrying out the process of the invention and are given by way of illustration only.

EXAMPLE I

*Preparation of 2:1'-dimethyl-1:2'-thioquinocyazine iodide*

3.0 parts (1 mol.) by weight of 1-amino benzthiazole and 3.5 parts (1 mol.) of 2-methyl mercapto quinoline and 7.5 parts (2 mols.) of methyl p-toluene sulphonate are mixed and heated together to a temperature of 130° C. to 140° C. for 3½ hours. The almost solid mass obtained is then refluxed for 1 hour with 40 parts of dry pyridine and the clear solution poured into a hot solution of 10 parts of potassium iodide in 500 ccs. of water. The iodide of the dyestuff is immediately precipitated as a yellow solid. On crystallization from methyl alcohol, in which it is sparingly soluble, it is obtained as bright yellow prismatic needles of M. P. 263° C.

EXAMPLE II

*Preparation of 2-methyl-2'-ethylthiocyazine iodide*

3.62 parts (1 mol.) of 1-methylmercaptobenzthiazole and 3.75 parts (1 mol.) of methyl p-toluene sulphonate are heated together for 3½ hours at 130° C. 5.18 parts (1 mol.) of N-ethyl-1-imino-benzthiazolinehydrobromide are then added and the mixture refluxed for 1 hour with 40 parts of dry pyridine. The pale yellow solution is then poured into a solution of 10 parts of potassium iodide in 500 ccs. of water and the iodide of the dyestuff precipitated as a pale yellow solid.

On crystallizing from methyl alcohol, in which it is sparingly soluble, it is obtained as minute yellow needles having a M. P. 265° C.

The compound N-ethyl-1-imino-benzthiazoline hydrobromide used above may be obtained by condensing ethyl aniline hydrochloride with potassium thiocyanate in order to produce ethyl-phenyl-thio-carbamide which is then dissolved in chloroform and treated with one molecular proportion of bromine; on removal of the chloroform N-ethyl-1-imino-benzthiazoline-hydrobromide is obtained as a solid residue which may be recrystallized from spirit. The reaction between this compound and 1-methyl mercapto benzthiazole may be illustrated as follows:—

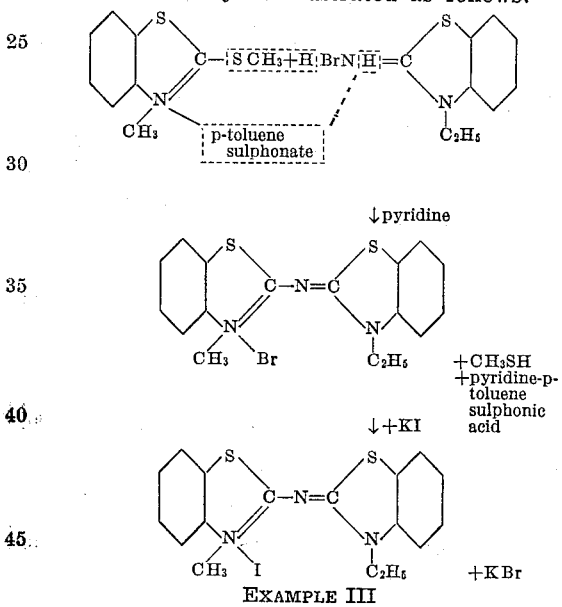

Example III

*Preparation of 1:1'-dibenzthiazolyl formamidine*

10 gms. of 1-aminobenzthiazole were boiled for a few minutes together with 20 ccs. of ethylorthoformate. The aminobenzthiazole readily went into solution and after a short while a precipitate was formed. The mixture was diluted with spirit and the precipitate collected and recrystallized from spirit to yield pale yellow needles melting at 250° C.

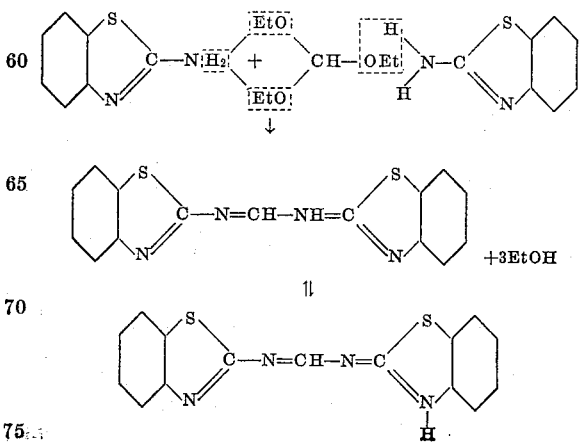

This product on heating with two molecular proportions of methyl-p-toluene sulphonate gave the dimethyl-p-toluene sulphonate as a yellow dye.

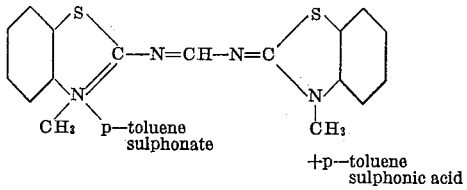

Example IV

*Preparation of 1:1'-dibenzoxazolyl formamidine*

0.9 gm. of aminobenzoxazole were boiled for a few minutes in an excess of ethyl-ortho-formate until the precipitate was deposited. The mixture was then diluted with spirit, filtered and washed and the residue recrystallized from dry spirit to yield colourless needles melting at 268° C.

(a) 2:2'-di-β-naphthathiazolyl formamidine was prepared in a similar manner from 2-amino-β-naphthathiazole and ethyl-ortho-formate as yellow needles melting at 284° C.

(b) 1:1'-di-α-naphthathiazolyl formamidine was prepared similarly from 1-amino-α-naphthathiazole and ethyl-ortho-formate as yellow needles melting at 315° C.

(c) 5:5'-diethoxy 1:1'-dibenzthiazolyl formamidine was prepared similarly from 1-amino-5-ethoxy benzthiazole and ethyl-ortho-formate as yellow cubes melting at 218° C.

(d) 2:2'-dithiazolyl formamidine was prepared in a similar manner from 2-amino-thiazole and ethyl-ortho-formate as pale yellow needles melting at 183° C.

Example V 2-para-dimethylamino-benzalamino-benzthiazole was prepared by heating 3 gms. of 1-aminobenzthiazole together with 3 gms. of para-dimethylaminobenzaldehyde for one hour at 140° C. and recrystallizing the solid mass from benzene to give orange prismatic needles melting at 188° C.

(a) The corresponding ethiodide was prepared by treating the product with ethyliodide but was found to be extremely unstable.

(b) 2-para-dimethylamino-benzalamino-β-naphthathiazole was prepared similarly from 2-amino-β-naphthathiazole and para-dimethylaminobenzaldehyde as reddish-brown crystals melting at 168° C.

(c) 2-para-dimethylamino-benzalamino-thiazole was prepared in a similar manner from 2-amino-thiazole and para-dimethylamino-benzaldehyde as yellow crystals, melting at 118° C.

(d) 5-ethoxy-1-para-dimethylamino-benzalaminobenzthiazole was prepared similarly from 1-amino-5-ethoxy-benzthiazole and para-dimethyl-aminobenzaldehyde as orange prismatic needles melting at 184° C.

(e) 1-para-dimethylaminobenzalamino-α-naphthathiazole was prepared from 1-amino-α naphtha thiazole and para-dimethyl-aminobenzaldehyde as yellow needles melting at 176° C.

Example VI

1-N-methyl-dihydro-benzthiazolylidine-aminobenzthiazole was prepared by heating 3 gms. of 1-methylmercapto benzthiazole with 3.7 gms. of methyl-p-toluene sulphonate for three hours at 130–140° C. 3 gms. of 1-amino-benzthiazole and 20 ccs. of pyridine were then added and the resulting mixture poured into water when a dyestuff was precipitated. On filtering and recrystallizing yellow cubes were produced melting at 184° C.

(a) 1-N-methyl-dihydro-benzoxazolylidine-benzthiazole was prepared in a similar manner from 1-methylmercaptobenzoxazole, methyl-p-toluene sulphonate and 1-amino-benzthiazole as colourless needles melting at 170° C.

(b) N-methyl-dihydro-quinolylidine-2:1'-aminobenzthiazole was prepared similarly from 2-methylmercapto quinoline, methyl-p-toluene sulphonate and 1-amino-benzthiazole as yellow needles melting at 169° C.

EXAMPLE VII

2:2'-dimethyl-thio-oxacyazine iodide was prepared by heating together 2 gms. of 1-amino-benzthiazole, 2.3 gms. of 1-methylmercaptobenzoxazole and 5.1 gms. of methyl-p-toluene sulphonate for 3½ hours at 130–140° C. 20 ccs. of pyridine were then added and the mixture boiled under a reflux condenser for half an hour after which it was poured into an aqueous solution of potassium iodide. The dyestuff precipitated out, was filtered, washed and recrystallized from methyl alcohol to yield colourless needles, melting at 298° C. with decomposition.

EXAMPLE VIII

2:2'-dimethyloxacyazine iodide 1 gm. of 1-amino-benzoxazole was heated with 1.4 gms. of methyl-p-toluene sulphonate for three hours at 130–140° C., and 1.3 gms. of 1-methylmercaptobenzoxazole and 1.5 gms. of methyl-p-toluene sulphonate were heated together for four hours at 100–110° C. The product resulting from the aminobenzoxazole fusion was then dissolved in 15 ccs. of pyridine and added to the product of the methylmercaptobenzoxazole fusion and the mixture was then gently heated under a reflux condenser for forty minutes and poured into an aqueous solution of potassium iodide. The dyestuff precipitated out was filtered off and washed and recrystallized from methyl alcohol and obtained as colourless needles melting at 300° C. with decomposition.

EXAMPLE IX

2:2'-dimethylthiocyazine-p-toluene sulphonate 3 gms. of 1-amino-benzthiazole, 3.8 gms. of 1-methylmercaptobenzthiazole, 7.65 gms. of methyl-p-toluene sulphonate were heated together for four hours at 140° C. and then 20 ccs. of pyridine were added and the mixture boiled under a reflux condenser for 10 minutes and washed out with a little spirit. The dye which was deposited was filtered, washed and recrystallized from methyl alcohol and pale yellow needles melting at 286–7° C.

EXAMPLE X

2:2'-dimethyl-thiocyazine iodide

The filtrate from the recrystallization of the above Example IX was poured into potassium iodide solution, filtered and washed and the residue recrystallized from methyl alcohol to give pale yellow needles, melting at 288° C.

EXAMPLE XI

2:2'-dimethyl-thiocyadiazine iodide 2 gms. of 1:1'-dibenzthiazolyl formamidine (prepared as in Example III) and 4.8 gms. of methyl-p-toluene sulphonate were heated together for 3½ hours at 185° C. 15 ccs. of pyridine were then added and the mixture was boiled under a reflux condenser for half an hour, after which it was poured into an aqueous solution of potassium iodide. The dyestuff which separated out was filtered off and recrystallized from methyl alcohol as almost colourless needles melting at 298° C.

EXAMPLE XII

2:2'-dimethyl 5:6-benzthiocyazine iodide 3 gms. of 1-amino-α-naphthathiazole, 3 gms. of 1-methyl-mercaptobenzthiazole and 5.9 gms. of methyl-p-toluene sulphonate were heated together for about four hours at 140° C. 25 ccs. of pyridine were added and the mixture was gently heated under a reflux condenser for a further 20 minutes after which it was poured into water. The dyestuff which separated out was collected, washed and dissolved in methyl alcohol and then poured into potassium iodide solution. The dyestuff which precipitated out was collected, washed and recrystallized from methyl alcohol as small yellow needles melting at 300° C.

EXAMPLE XIII

2:2'-dimethyl-3:4-benzthiocyazine-p-toluene sulphonate 3 gms. of 2-amino-β-naphthathiazole, 3 gms. of 1-methylmercapto-benzthiazole, 5.9 gms. of methyl-p-toluene sulphonate were heated for four hours at 140° C., after which 25 ccs. of pyridine were added and the mixture gently heated under a reflux condenser for 20 minutes. The mixture was then poured into water and the dyestuff extracted from the precipitate by treatment with methyl alcohol and recrystallized to give pale yellow hexagonal crystals, melting at 245° C.

EXAMPLE XIV

2:1'-dimethylthioiso 1:4'-cyazine iodide 1.4 gms. of 1-ethyl-quinoline-4-thione, 1.1 gms. of 1-aminobenzthiazole, 2.8 gms. of methyl-p-toluene sulphonate were heated together for 4 hours at 130–140° C. 20 ccs. of pyridine were then added and the mixture was poured into an aqueous solution of potassium iodide. The precipitate which formed was recrystallized from methyl alcohol to yield yellow needles melting at 230° C.

EXAMPLE XV 20 gms. of 1-aminobenzthiazole, 5.8 gms. of 1:3:3'-trimethyl-2-acetanilido vinyl indolenium iodide and 40 ccs. of pyridine were mixed and heated together for 30 minutes, after which they were poured into a dilute solution of spirit whereupon an oil separated out. This was separated off, dissolved in spirit and allowed to stand when orange brown crystals melting at 181° C. separated out.

EXAMPLE XVI 2-methyl-1'-ethyl-1:2'-thioquinocyazine iodide 2.4 gms. of 1-aminobenzthiazolemethobromide and 4.10 gms. of 2-iodo-quinoline ethiodide were dissolved in 60 ccs. of dry spirit on a water bath. 0.46 gm. of sodium dissolved in 10 ccs. of spirit were then added. The colour of the mixture changed rapidly from pink to deep orange. The mixture was then boiled for a further 15 minutes and poured into water, when the product separated out as a dark red solid. This was collected, washed and recrystallized from methyl alcohol, giving small orange crystals melting at 253° C.

EXAMPLE XVII

*1:1'-dimethyl-2:4'-cyazine iodide*

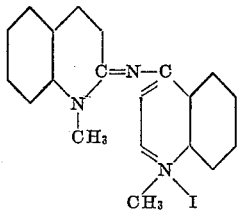

This compound was prepared by condensing one molecular proportion of 2-methyl-mercapto quinoline methyl-p-toluene sulphonate with one molecular proportion of 4-aminoquinoline methiodide in the presence of one molecular proportion of sodium ethylate. (4-aminoquinoline methiodide was prepared by converting 4-chlorquinoline (Beilstein Vol. IV 1899, page 254) to 4-iodoquinoline methiodide by heating with excess methyl iodide suspending the 4-iodoquinoline methiodide in hot alcohol and saturating with dry ammonia gas, filtering and evolving when 4-amino quinoline methiodide crystallized out.)

EXAMPLE XVIII

*1:1'-dimethyl-4:4'-cyazine iodide*

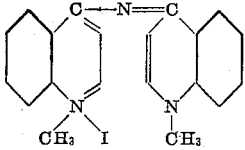

This compound was prepared by treating one molecular proportion of N-methyl-quinoline-4-thione with methyl-p-toluene sulphonate, adding one molecular proportion of 4-aminoquinoline methiodide and one molecular proportion of sodium ethylate and warming the mixture on a water bath.

EXAMPLE XIX

*2:2':7-trimethyl thiocyadiazine iodide*

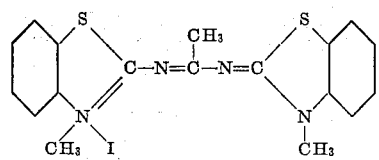

This compound was prepared by condensing two molecular proportions of 1-aminobenzthiazole methyl-p-toluene sulphonate with ethyl orthoacetate in the presence of pyridine and treating the resulting product with potassium iodide.

The nomenclature which I have adopted in this specification and claims may be explained as follows:

Cyazine=an alkyl salt containing two heterocyclic rings linked by a single nitrogen atom (—N=).

Cyadiazine=an alkyl salt containing two heterocyclic rings linked by the chain

Carbocyazine=an alkyl salt containing two heterocyclic rings linked by the chain

—CH=CH—N=;

when the two heterocyclic nuclei are different the term indicating the nucleus attached to the —CH=CH— group of the chain precedes the term "carbo", whilst that for the nucleus attached to the nitrogen atom precedes the term "cyazine".

I claim:

1. The process which comprises heating in the presence of an acid binding substance a heterocyclic nitrogen base of the type used in the production of cyanine dyes having in a position taken from the class consisting of alpha and gamma positions to a ring nitrogen atom an acyclic nitrogen atom having at least one free hydrogen atom attached thereto, with an alkyl quaternary salt of a heterocyclic nitrogen base of the type used in the production of cyanine dyes, having a thioether group substituted in a position selected from the class consisting of alpha and gamma positions to the nitrogen atom, the first named heterocyclic nitrogen base being reacted with an alkyl salt at some stage of the process.

2. The process which comprises heating in the presence of an acid binding substance an alkyl salt of a heterocyclic nitrogen base of the type used in the preparation of cyanine dyes having substituted in a position selected from the class consisting of alpha and gamma positions to a ring nitrogen atom an acyclic nitrogen atom having at least one free hydrogen atom attached thereto, with an alkyl quaternary salt of a heterocyclic nitrogen base of the type used in the production of cyanine dyes having a thioether group substituted in a position selected from the class consisting of alpha and gamma positions to the nitrogen atom.

3. The process which comprises mixing a heterocyclic nitrogen base compound of the type used in the preparation of cyanine dyes having substituted in a position selected from the class consisting of alpha and gamma positions to the ring nitrogen atom an acyclic nitrogen atom having at least one free nitrogen atom attached thereto, with a heterocyclic nitrogen base compound of the type used in the preparation of cyanine dyes having a thioether group substituted in a position selected from the class consisting of alpha and gamma positions to the ring nitrogen atom, and an alkyl salt and fusing them together so that the formation of alkyl quaternary salts and the condensation reaction are carried out simultaneously.

4. The process of claim 3 wherein an alkyl paratoluene sulphonate is employed as the alkyl salt and the condensation reaction is completed by the addition of an acid binding substance.

5. The process which comprises reacting 1-methyl-mercaptobenzthiazole with methylparatoluene sulphonate and then reacting the product with N-ethyl-1-iminobenzthiazoline-hydrobromide in the presence of pyridine, adding the reaction product to an aqueous solution containing potassium iodide and precipitating the dyestuff.

JOHN DAVID KENDALL.